Patented Apr. 10, 1928.

1,665,236

UNITED STATES PATENT OFFICE.

JOHN P. TRICKEY, OF EVANSTON, AND CARL S. MINER, OF CHICAGO, ILLINOIS, ASSIGNORS TO THE QUAKER OATS COMPANY, OF CHICAGO, ILLINOIS, A CORPORATION OF NEW JERSEY.

PROCESS FOR OBTAINING FURANE DERIVATIVES.

No Drawing. Application filed July 5, 1924, Serial No. 724,428. Renewed February 27, 1928.

This invention pertains to methods or processes for obtaining furane derivatives and more particularly relates to processes for obtaining pyromucic acid and resinous products of furane derivatives.

It is the purpose of this invention to provide a rapid, inexpensive and efficient process for making resinous materials such as furfuralcoholic resin from furane derivatives and at the same time provide an efficient process for obtaining pyromucic acid; furthermore, it is a purpose of this invention to provide a process for obtaining the resins and pyromucic acid in a high degree of purity.

In order to carry out the above purposes and further objects which may hereinafter become apparent, we have developed a process wherein the products initially used are furfural, a suitable alkali such as sodium hydroxide and a suitable mineral acid such as sulphuric acid. By means of our process we are able to obtain from these materials furfuralcoholic resin, also desired quantities of furfural resin, pyromucic acid and a by-product comprising a salt of sodium and sulphuric acid, or a salt of the particular mineral acid used.

Under properly controlled conditions, it has been found that when furfural is treated with sodium hydroxide, furfuralcohol and a sodium salt of pyromucic acid are formed as a result of the chemical reaction involving simultaneous oxidation and reduction. Approximately four pounds of sodium hydroxide is sufficient to treat about nineteen pounds of furfural. In order to bring about this reaction, the sodium hydroxide is preferably slowly added to the furfural in order to avoid excessive heating and the mixture is at the same time maintained at a low temperature, approximating 15° C. for example. The sodium hydroxide is preferably added in a water solution of a strength such that fourteen and one-half pounds of solution will contain the four pounds of sodium hydroxide. The mixture is preferably agitated while at this low temperature, with sufficient alkali until all or substantially all of the furfural is transformed into the alcohol and the sodium salt of pyromucic acid.

By means of our process we transform the furfuralcohol formed in the above reaction into a resinous material and also transform the sodium salt of pyromucic acid into free pyromucic acid. To accomplish these results we add to the mixture a quantity of acid, preferably mineral acid such as $33\frac{1}{3}$ per cent sulphuric acid solution, until the mixture is slightly acid to congo red. Under these conditions free pyromucic acid will be liberated. At the same time, considerable quantities of a salt of the mineral acid will be formed, and if the particular chemicals above cited are used, this will be a sodium salt of sulphuric acid, the greater part of which will precipitate at this point. Small quantities of the pyromucic acid which is produced may also precipitate at this point. These precipitates may now be separated from the mixture, as by filtering and washing. Up to this point the mixture may be kept at a low temperature.

At this point the resulting mixture contains in solution considerable quantities of pyromucic acid and furfuralcohol, and also contains a small amount of the mineral acid which has been added in quantities slightly in excess of the amount necessary to recover all of the pyromucic acid from its sodium salt. The mixture may also contain at this point a small amount of furfural, the exact quantity of which may be fixed by controlling the amount of sodium hydroxide initially added.

In order to resinify the alcohol and also any remaining furfural, the mixture may now be heated to a temperature approximating 80° C. As a result of the catalytic effect of the mineral acid present accompanied by the heating, the alcohol undergoes further reaction which if carried sufficiently far results in complete resinification. The furfural will also become transformed into a resinous material. It has been observed in the case of furfuralcohol that if the reaction is stopped at its intermediate stages, products are formed of a non-resinous nature which differ substantially from the furfuralcohol. The speed and extent of this resinification may be controlled within wide limits by varying the temperature and the amount of mineral acid present. The reaction being exothermic in character will proceed of itself after the mixture is heated to in the neighborhood of 80° C. If this reaction takes place in a large volume of the mixture, the heat resulting from the reaction may sometimes be excessive and thus cause the reaction to proceed too rapidly and to become difficult to control. Accordingly, in treating large volumes of the mixture, as soon as the reaction starts we proceed to control the temperature by applications of a cooling medium. We have found it desirable with large volumes to maintain the temperature at about 110° C. or less. This temperature may be maintained, for example, by the use of refrigerating coils within or around the vessel containing the mixture.

After the resinification has proceeded to the desired extent or when a resin of the desired consistency has been obtained, the resin may be separated from the liquid mixture and then purified. To purify the resin it may be treated with hot water and simultaneously agitated. The hot water may be accompanied by suitable materials for neutralizing any acid which may remain in the resin. For example, sodium carbonate may be added in sufficient quantities to render the resin slightly alkaline. The water is then poured off and the resin preferably again washed.

After the alcohol and furfural have been resinified and removed from the liquid mixture, the mixture may still contain small amounts of the mineral acid, as well as small amounts of the salt of the mineral acid in solution, but the larger portion of the material remaining in solution will consist of pyromucic acid. Upon cooling this mixture, the pyromucic acid precipitates and the mineral acid and salt thereof may be washed off, leaving the pyromucic acid in a high degree of purity. The pyromucic acid may be removed by any other means as by extraction of the reaction mixture with organic solvents such as ether.

From the above it will be seen that very efficient use is made of all of the materials involved in the process. It will be particularly noted that the mineral acid, such as the sulphuric acid, serves a double purpose, namely, it serves to form the free pyromucic acid from the acid salt and later the remaining mineral acid serves as a catalyzer in bringing about the resinification of the alcohol.

It will be understood that various changes and substitutions of equivalents may be made without departing from the scope and principle of the invention set forth in the appended claims.

Having thus described our invention, what we claim as new and desire to secure by Letters Patent of the United States, is:

1. The process of obtaining furane derivatives which comprises mixing furfural and an alkali in a manner whereby furfuralcohol and a salt of pyromucic acid are produced, and then adding a quantity of an acid sufficient to liberate substantially all of the pyromucic acid and to cause resinification in situ of the alcohol when the mixture is heated.

2. The process of obtaining furane derivatives which comprises mixing furfural and sodium hydroxide in a manner whereby sodium furfuralcohol and a sodium salt of pyromucic acid are produced, and then adding a quantity of an acid sufficient to liberate substantially all of the pyromucic acid and to cause resinification in situ of the alcohol when the mixture is heated.

3. The process of obtaining furane derivatives which comprises mixing furfural and an alkali in a manner whereby furfuralcohol and a salt of pyromucic acid are produced, and then adding a quantity of a mineral acid sufficient to liberate substantially all of the pyromucic acid and to cause resinification in situ of the alcohol when the mixture is heated.

4. The process of obtaining furane derivatives which comprises mixing furfural and sodium hydroxide in a manner whereby furfuralcohol and a sodium salt of pyromucic acid are produced, and then adding a quantity of a mineral acid sufficient to liberate substantially all of the pyromucic acid and to cause resinification in situ of the alcohol and its separation from the remaining liquid.

5. The process of obtaining furane derivatives which comprises mixing furfural and an alkali in a manner whereby furfuralcohol and a salt of pyromucic acid are produced, and then adding a quantity of an acid sufficient to liberate substantially all of the pyromucic acid and to cause resinification in situ of the alcohol and any remaining furfural when the mixture is heated.

6. The process of obtaining furane derivatives which comprises mixing furfural and an alkali in a manner whereby furfuralcohol and a salt of pyromucic acid are produced, and then adding a quantity of an acid sufficient to cause substantially all of the pyromucic acid to be liberated and such as to cause by catalytic action the resinification in situ of the alcohol and any remaining furfural when the mixture is heated.

7. The process of obtaining furane derivatives which comprises mixing furfural and an alkali in a manner whereby furfuralcohol and a salt of pyromucic acid are produced, and then adding a quantity of sulphuric acid whereby pyromucic acid is liberated and such that when the mixture is thereafter heated the alcohol is caused to resinify in situ.

8. The process of obtaining furane derivatives which comprises mixing furfural and an alkali in a manner whereby furfuralcohol and a salt of pyromucic acid are produced, then adding a quantity of a mineral acid whereby pyromucic acid is liberated, heating the mixture whereby the alcohol resinifies in situ and separates, and thereafter separating the pyromucic acid from the remaining mixture.

9. The process of obtaining furane derivatives which comprises mixing furfural and an alkali in a manner whereby furfuralcohol and a salt of pyromucic acid are produced, then adding a quantity of an acid sufficient only to cause substantially all of the pyromucic acid to be liberated and to form a water insoluble product from the furfuralcohol which is capable of ultimate transformation into a substantially insoluble infusible resin.

10. The herein described method which comprises forming a mixture of furfuralcohol and a salt of pyromucic acid, then adding a quantity of an acid such that pyromucic acid is liberated, and thereafter heating the mixture whereby the alcohol is caused to resinify in situ.

11. The herein described process for the separation in substantially pure form of pyromucic acid and a furfuralcohol resin from a mixture of a salt of pyromucic acid and furfuralcohol resulting from the simultaneous oxidation and reduction of furfural which comprises adding a quantity of an acid to said mixture such that substantially all of the pyromucic acid is liberated, then heating the mixture whereby the furfuralcohol is resinified in situ and separates, and thereafter separating the pyromucic acid from the remaining mixture.

12. The herein described process for the separation in substantially pure form of pyromucic acid and a furfuralcohol resin from a mixture of a salt of pyromucic acid and furfuralcohol resulting from the simultaneous oxidation and reduction of furfural which comprises adding a quantity of a mineral acid to said mixture such that substantially all of the pyromucic acid is liberated, heating the mixture whereby the furfuralcohol is resinified in situ and separates, and thereafter separating the pyromucic acid from the remaining mixture.

13. The herein described process for the separation in substantially pure form of pyromucic acid and a furfuralcohol resin from a mixture of a salt of pyromucic acid and furfuralcohol resulting from the simultaneous oxidation and reduction of furfural which comprises adding a quantity of sulphuric acid to said mixture such that substantially all of the pyromucic acid is liberated, heating the mixture whereby the furfuralcohol is resinified in situ and separates, and thereafter separating the pyromucic acid from the remaining mixture.

14. The process of obtaining furane derivatives which comprises mixing furfural and sodium hydroxide whereby furfuralcohol and a sodium salt of pyromucic acid are formed, then adding a quantity of sulphuric acid such that pyromucic acid is liberated, and a salt of sodium and sulphuric acid is precipitated, separating the sodium salt, heating the remaining liquid mixture whereby the alcohol and any remaining furfural are resinified in situ as a result of the catalytic action of remaining mineral acid, separating and purifying the resin formed, and separating the pyromucic acid.

In witness whereof, we have hereunto subscribed our names.

JOHN P. TRICKEY.
CARL S. MINER.